(12) United States Patent
Lee et al.

(10) Patent No.: US 8,055,221 B2
(45) Date of Patent: Nov. 8, 2011

(54) METHOD OF PROVIDING VIDEO CALL SERVICE IN MOBILE STATION IN A WEAK SIGNAL ENVIRONMENT

(75) Inventors: Seung-Yeob Lee, Seongnam-si (KR); Su-Hyung Eom, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1278 days.

(21) Appl. No.: 11/407,168

(22) Filed: Apr. 19, 2006

(65) Prior Publication Data

US 2006/0238608 A1 Oct. 26, 2006

(30) Foreign Application Priority Data

Apr. 21, 2005 (KR) .................. 10-2005-0033325

(51) Int. Cl.
*H04B 1/18* (2006.01)
(52) U.S. Cl. .................. 455/180.1; 348/14.01
(58) Field of Classification Search ............. 370/395.21, 370/333; 714/704, 705; 398/127; 358/426.09; 379/93.01; 455/180.01, 556
See application file for complete search history.

(56) References Cited

U.S. PATENT DOCUMENTS

| 5,084,871 | A | * | 1/1992 | Carn et al. ................ 370/462 |
| 6,097,965 | A | | 8/2000 | Honkasalo et al. |
| 6,105,158 | A | * | 8/2000 | Chen et al. ................ 714/755 |
| 7,124,333 | B2 | * | 10/2006 | Fukushima et al. ........ 370/395.4 |
| 2002/0077072 | A1 | * | 6/2002 | Suzuki .................. 455/180.1 |

FOREIGN PATENT DOCUMENTS

| WO | WO 02/091708 | 11/2002 |
| WO | WO 2005/029903 | 3/2005 |

* cited by examiner

*Primary Examiner* — Curtis Kuntz
*Assistant Examiner* — Maria El-Zoobi
(74) *Attorney, Agent, or Firm* — The Farrell Law Firm, P.C.

(57) ABSTRACT

Improving the audio QoS of a video call service in a weak signal environment is accomplished. To do this, even if data is damaged in a weak signal environment during a video call using a mobile station in the weak signal environment, an audio call is preferentially processed such that a minimum audio QoS can be secured. If a transmitting mobile station enters into a weak signal environment while transmitting audio data and video data together during a video call, the transmitting mobile station transmits only audio data, and in response to this, a receiving mobile station processes the audio data transmitted during a set time interval and continuously reproduces the audio data. Audio interruption can be reduced, thereby securing a minimum audio QoS.

11 Claims, 6 Drawing Sheets

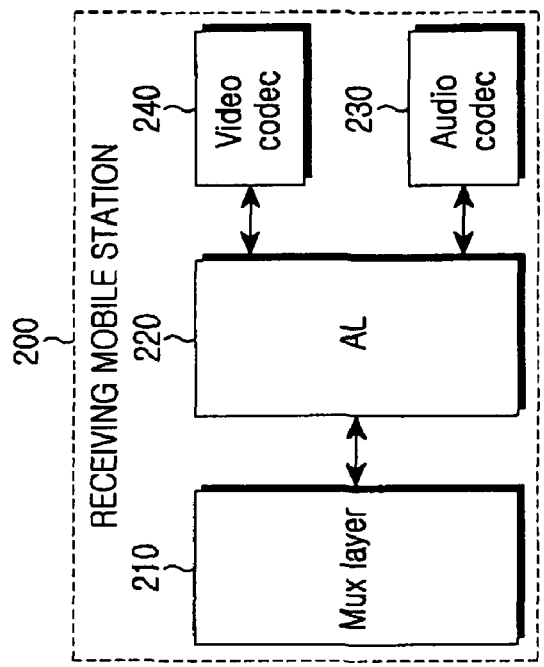
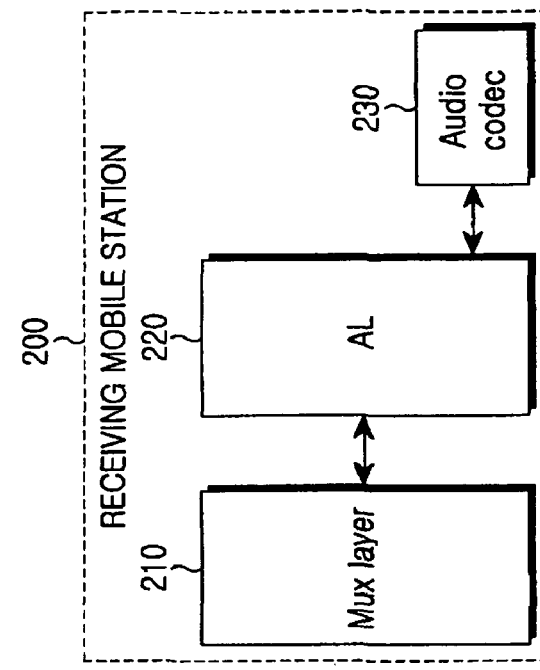
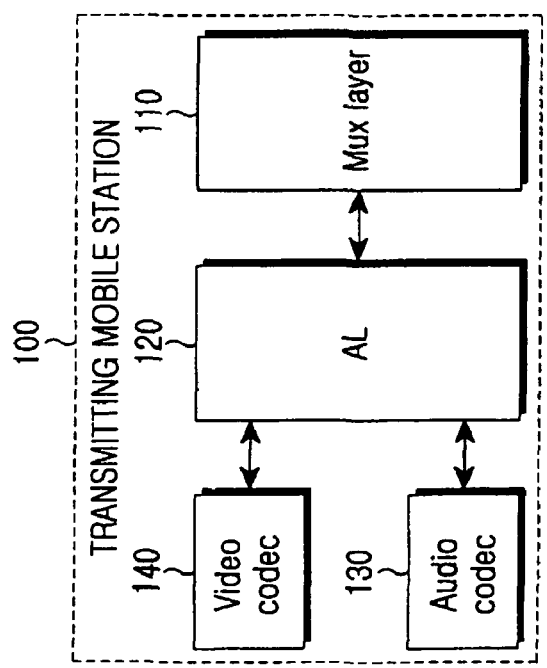
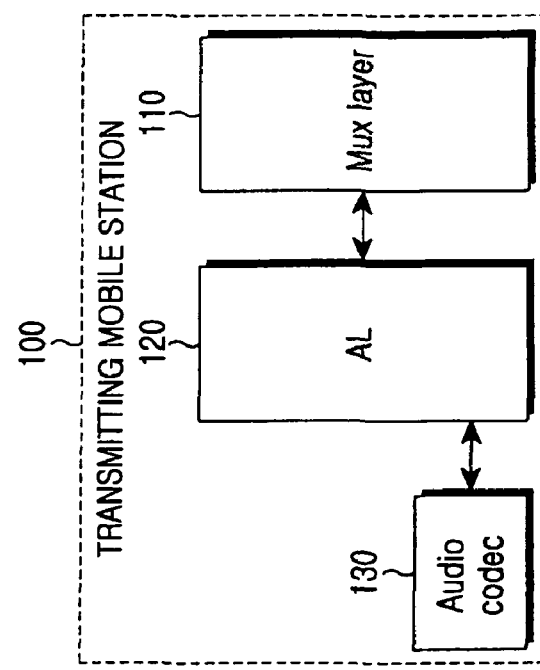
FIG.3A
FIG.3B

METHOD OF PROVIDING VIDEO CALL SERVICE IN MOBILE STATION IN A WEAK SIGNAL ENVIRONMENT

PRIORITY

This application claims priority under 35 U.S.C. §119 to an application entitled "Method of Providing Video Call Service in Mobile Station Considering State of Weak Electric Field" filed in the Korean Intellectual Property Office on Apr. 21, 2005 and assigned Serial No. 2005-33325, the contents of which are incorporated herein by reference.

BACKGROUND OF THE INVENTION

1. Field of the Invention

The present invention relates generally to a method of providing a video call service in a mobile station, and in particular, to a method of providing a video call service in a mobile station so as to preferentially guarantee an audio quality of service (QoS) in a weak signal environment during a video call.

2. Description of the Related Art

Commonly, a video call service in a transmitting mobile station is achieved by compressing audio and video (A/V) data and transmitting it to a receiving mobile station. The A/V data is compressed to transmit more data in a given bandwidth. In such a video call method using a mobile station, control data is inserted in the compressed A/V data using a data service function and transmitted/received through a traffic channel. However, the reliability of the QoS is not guaranteed due to a delay and jitter resulting from the channel characteristics. Thus, a predetermined protocol is used in a transmitting mobile station to realize real-time streaming by detecting a data loss occurring in such a transmitting/receiving process.

A/V data is mainly damaged during transmission in a wireless environment, and to correct for the damage, the A/V data is transmitted with control data to identify an error using a protocol such as Real-time Transport Protocol (RTP), H.324M, H.323, or Session Initiation Protocol (SIP). In particular, H.323 that is an International Telecommunication Union-Telecommunication Standardization Sector (ITU-T) video call standard is a protocol to transmit compressed A/V data in a Wideband Code Division Multiple Access (WCDMA) based transmitting mobile station. According to some of the above-described protocols, data loss can be recovered through re-transmission. However, since a video call needs real-time streaming, the protocols using the re-transmission technique are not used, and data is only minimally corrected using error correction code or discarded in a case where an error is discovered as a result of an integrity check.

In the WCDMA, H.324M is used to perform a video call, so the description will proceed based on H.324M, a $3^{rd}$ generation (3G) video call standard protocol. A process of providing a video call service will now be described in detail with reference to FIGS. 1 and 2. FIG. 1 is a diagram for explaining a method of providing a video call service in a conventional transmitting mobile station, and FIG. 2 is a diagram for explaining a method of performing a video call in a conventional receiving mobile station.

Referring to FIG. 1, according to H.324M, every MUX-PDU (Multiplex-Protocol Data Unit) 20 is created by multiplexing encoded audio data 10 with video data every 20 ms. Then, the transmitting mobile station transmits the MUX-PDUs 20 to an air network through traffic channels S10 to S60 at a preset time interval. In the receiving mobile station, audio data and video data are separated from A/V data transmitted through the channels S10 to S60 by demultiplexing the transmitted A/V data as illustrated in FIG. 2, and the separated audio data and video data are transmitted to a codec decoder outputting audio and video signals.

However, a video call in a handoff area or in a weak signal environment area in which the strength of an electronic wave is weak experiences occasional video freezing and audio interruption. For example, while a MUX-PDU can be normally received in a good channel state of the channel S10 and audio data A0 can be reproduced for 20 ms, audio reproduction cannot be achieved for 40 ms due to loss of MUX-PDUs in bad channel states of the channels S20 and S30, and then when a normal MUX-PDU is received through the channel S40, audio reproduction can be achieved for 20 ms. Likewise, according channel states, audio interruption occurs by obtaining audio data A0, A3, and A5 among entire audio data A0 to A5 as illustrated in reference numeral 30 of FIG. 2.

From the point of view of a user, since an image output using previous data is continuously displayed even if video data is damaged, the user can continue to view the other party's face although it is a frozen image. However, audio interruption considerably degrades the service, and if the audio interruption exceeds a predetermined level, the audio is hardly audible. This phenomenon makes QoS of video data seem better than QoS of audio data from the point of view of the user. However, from the point of view of a mobile station transmitting/receiving data via the air, since audio and video data is combined single data, the QoS of the audio and video data are the same. That is, damage to A/V data means that both the audio data and the video data are damaged, and since there is no method of performing quality management by separating the A/V data, reliability of QoS of both the audio data and the video data is degraded.

SUMMARY OF THE INVENTION

As described above, in a conventional video call, the reliability of the QoS according to channel states is considerably degraded, and therefore not only the video transmission but also an audio call may not be performed. Accordingly, the QoS of a video call and call satisfaction of a user are reduced compared to a conventional audio call.

An object of the present invention is to substantially solve at least the above problems and/or disadvantages and to provide at least the advantages below. Accordingly, an object of the present invention is to provide a method of providing a video call service in a mobile station to guarantee an audio quality of service (QoS) in a weak signal environment during a video call.

According to one aspect of the present invention, there is provided a method of providing a video call service in a mobile station in a weak signal environment, the method includes determining, by a receiving mobile station, a state of a weak electric field based on whether audio and video (A/V) data transmitted from a transmitting mobile station is damaged during a video call; if there is a weak signal environment, requesting, by the receiving mobile station, that audio data is preferentially transmitted; generating, by the transmitting mobile station, a transmittable amount of audio data in response to the request and repeatedly transmitting the audio data a predetermined number of times; and when the audio data is received, processing, by the receiving mobile station, the audio data so that the audio data is continuously reproduced.

BRIEF DESCRIPTION OF THE DRAWINGS

The above and other objects, features and advantages of the present invention will become more apparent from the following detailed description when taken in conjunction with the accompanying drawings in which:

FIGS. 3A and 3B are block diagrams of a transmitting mobile station and a receiving mobile station according to a preferred embodiment of the present invention;

DETAILED DESCRIPTION OF THE PREFERRED EMBODIMENT

Figure 1:
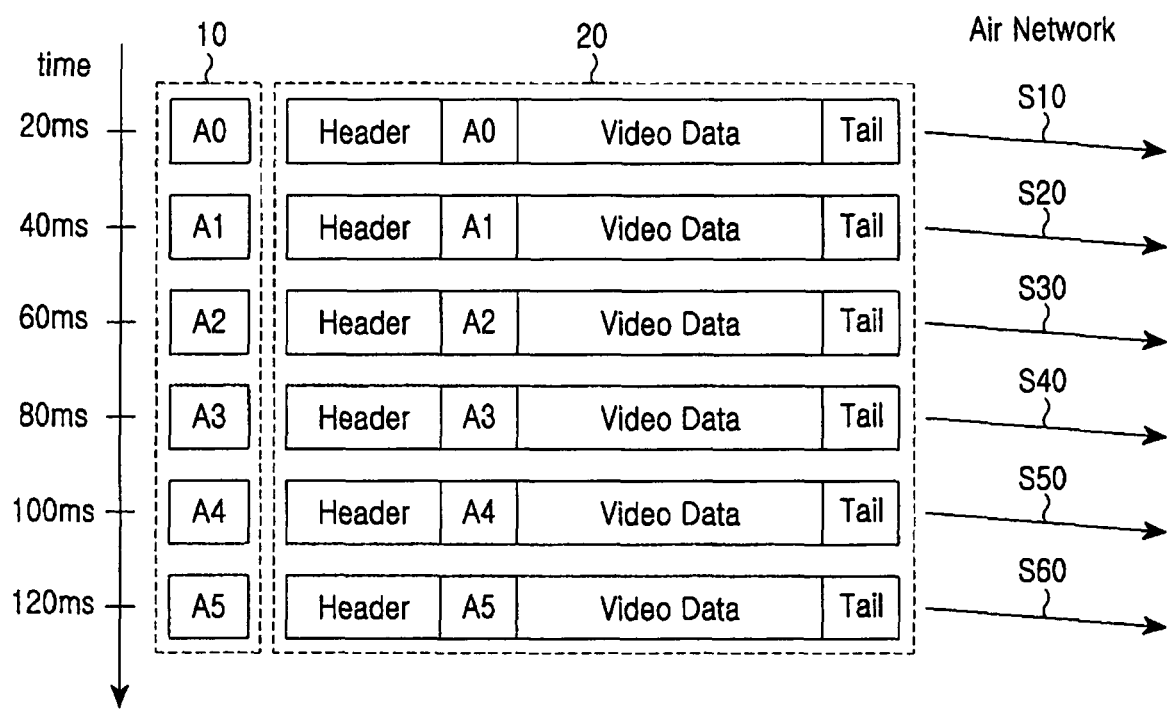
FIG. 1 is a diagram for explaining a method of providing a video call service in a conventional transmitting mobile station.
Figure 2:
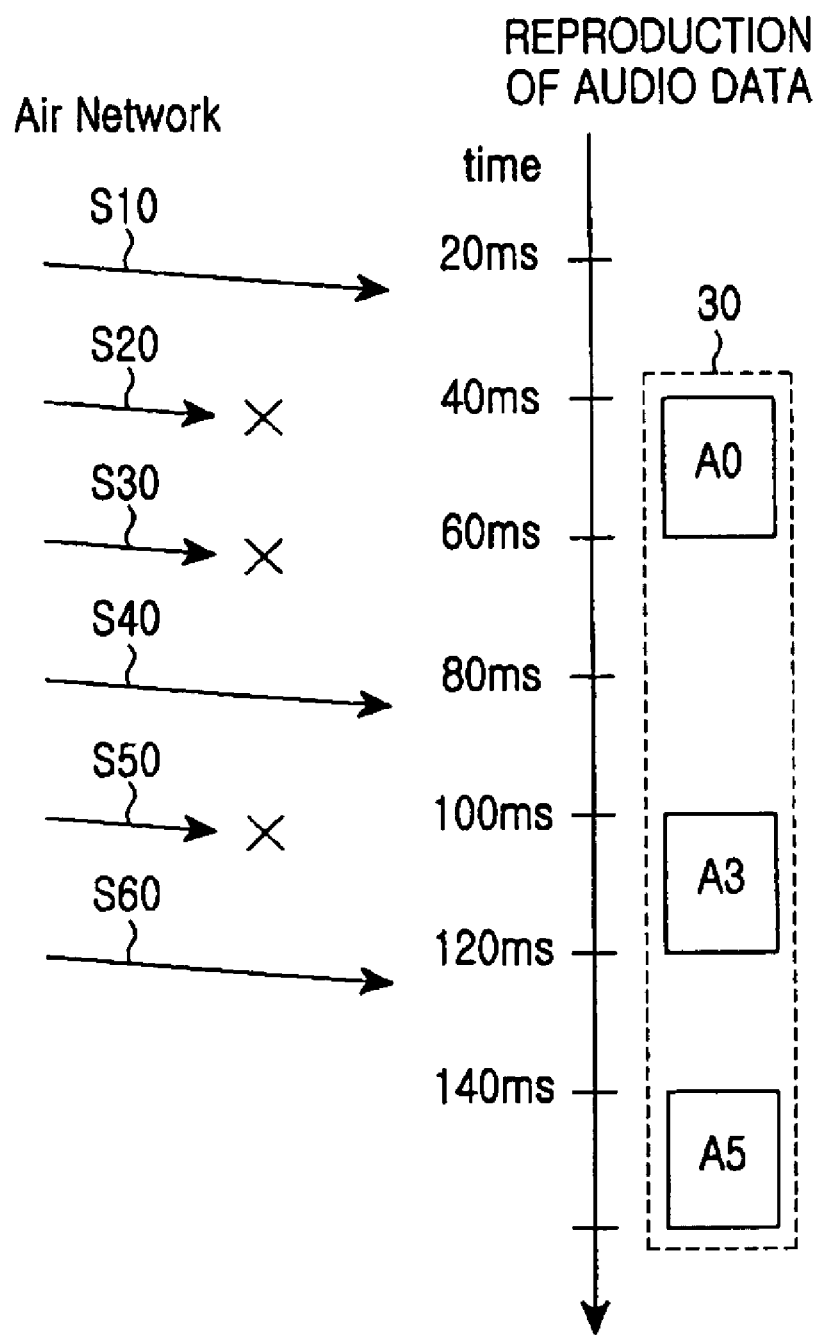
FIG. 2 is a diagram for explaining a method of performing a video call in a conventional receiving mobile station.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

In the present invention, a function of improving the audio QoS of a video call service in a weak signal environment is implemented. To do this, in the present invention, even if data is inevitably damaged in a weak signal environment during a video call using a mobile station in the weak signal environment, an audio call is preferentially processed such that a minimum audio QoS can be secured. Thus, if a transmitting mobile station enters into a weak signal environment while transmitting audio data and video data together during a video call, the transmitting mobile station transmits only audio data, and in response to this, a receiving mobile station processes audio data transmitted during a preset time interval and continuously reproduces the audio data. By doing this, audio interruption can be reduced, thereby securing a minimum audio QoS.

The components and operation of a mobile station in which the above-described function is implemented will now be described with reference to FIG. 3A and FIG. 3B. FIGS. 3A and 3B are block diagrams of a transmitting mobile station and a receiving mobile station according to a preferred embodiment of the present invention. Hereinafter, mobile stations having a video call function WCDMA type mobile stations based on H.324M.

FIG. 3A is illustrates the configuration of a transmitting mobile station and a receiving mobile station required in an excellent communication environment, FIG. 3B illustrates the configuration of a: transmitting mobile station and a receiving mobile station according to a preferred embodiment of the present invention in a bad communication environment.

In an excellent communication environment, when a user of a transmitting mobile station 100 makes a video call, an audio call path and a video data call path are established, and audio and video are transmitted to a receiving mobile station 200 through the microphone and camera equipped in the transmitting mobile station 100. Herein, in the transmitting mobile station 100, audio data input through the microphone is encoded by an audio codec 130, and video data input through the camera is encoded by a video codec 140. Then an H.223 based AL(Adaptation Layer) 120 receives the encoded data and adds to the encoded data a sequential number indicating the transmission order.

A MUX layer 110 generates a series of data stream by multiplexing the encoded data, adds Cyclic Redundancy Checking (CRC) to the encoded data so that the receiving mobile station 200 can determine if an error exists in the data transmitted form the transmitting mobile station 100 through a channel in order to allow the receiving mobile station 200 to demultiplex the data stream, and then transmits the CRC added data stream to the receiving mobile station 200 through the air, i.e., a wireless network. Since this process is described in an H.223 specification, which is one of components of the H.324M protocol, its detailed description is omitted. As described above, in an excellent communication environment, the transmitting mobile station 100 is configured to include the video codec 140, the audio codec 130, the AL 120, and the MUX layer 110 illustrated in FIG. 3A.

Similar to the transmitting mobile station 100 in an excellent communication environment, the receiving mobile station 200 is configured to include a MUX layer 210, an AL 220, an audio codec 230, and a video codec 240 illustrated in FIG. 3A. Thus, when single data in which A/V data is multiplexed is transmitted from the transmitting mobile station 100, the MUX layer 210 of the receiving mobile station 200 demultiplexes the transmitted data using the header of the transmitted data and determines if the transmitted data is successfully received by determining if an error exists in the transmitted data using a sequential number and CRC. If the transmitted data is successfully received, the transmitted data is divided into audio data and video data, transmitted to the audio codec 230 and the video codec 240 through the AL 220, respectively, and decoded. When the audio data and the video data are synchronized and output through the above process, a video call between the transmitting mobile station 100 and the receiving mobile station 200 is achieved.

Figure 4:
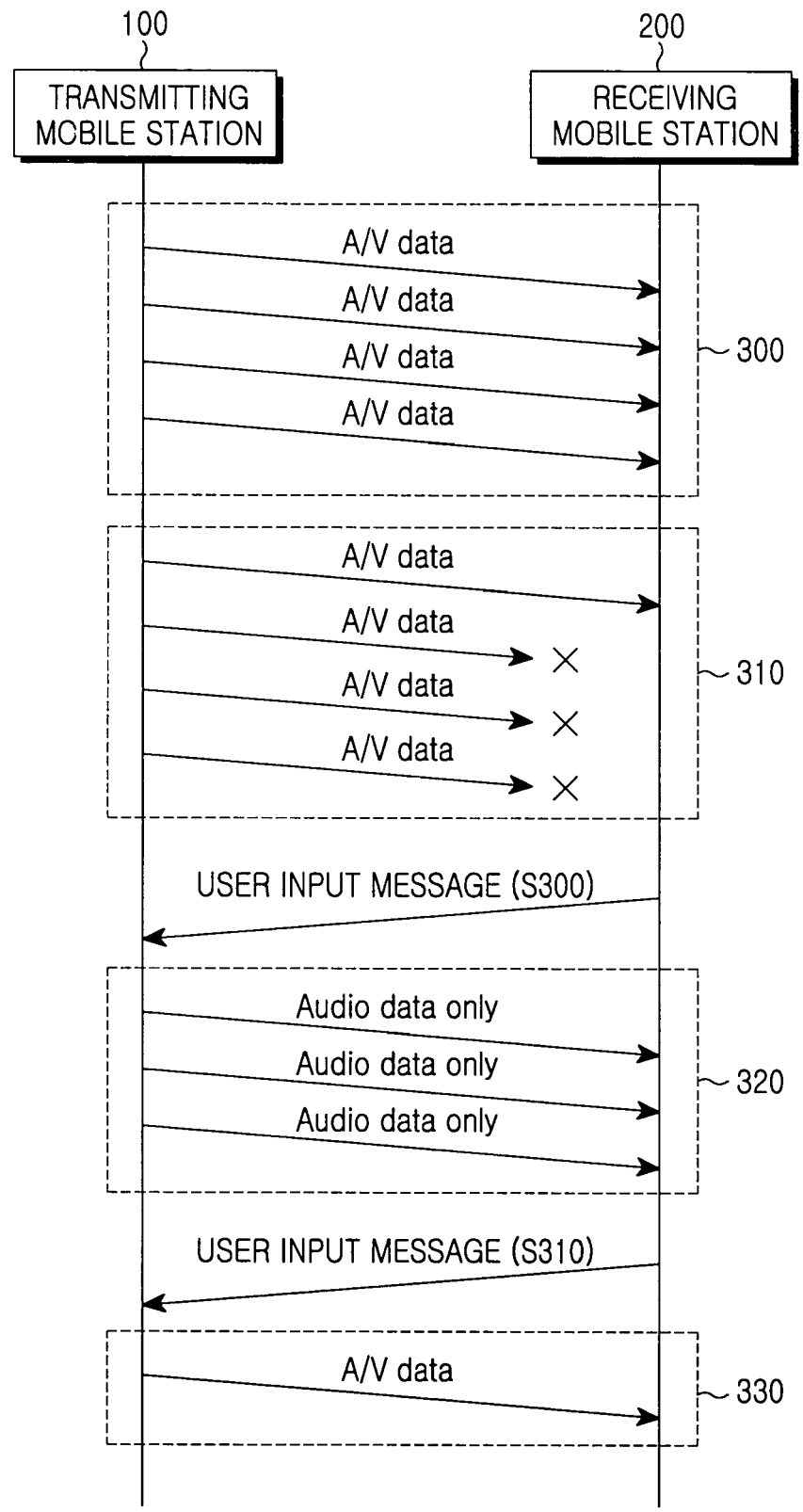
FIG. 4 is a signaling diagram for explaining a process of providing a video call service in a weak signal environment according to a preferred embodiment of the present invention.

A detailed example to which a preferred embodiment of the present invention is applied will now be described with reference to FIG. 4. FIG. 4 is a signaling diagram for explaining a process of providing a video call service in a weak signal environment according to a preferred embodiment of the present invention.

In the present embodiment, if a signal is weak or in an unstable state during a video call using a WCDMA mobile station with a limited band with, e.g., 64 kbps, the mobile station stops the transmission of the A/V data and instead allocates a band for audio data transmission wider such that audio data can be preferentially transmitted. By doing this, by repeatedly transmitting audio data through a wider band, a data loss can be reduced in a receiving mobile station, thereby securing audio QoS.

Referring to FIG. 4, in step 300, the transmitting mobile station 100 transmits to the receiving mobile station 200 single data in which audio data and video data is mixed during a first time interval. If a network state is stable, e.g., if a channel state is excellent, the receiving mobile station 200 normally receives the A/V data without data loss and performs a seamless video call including audio and video. However, even if the transmitting mobile station 100 transmits A/V data in the same way, if the network state is unstable, in step 310, the amount of data normally transmitted to the receiving mobile station 200 is reduced. Accordingly, video freezing and audio interruption occur.

To prevent this phenomenon, the receiving mobile station 200 monitors data transmitted from the transmitting mobile station 100, and if the amount of received data is below a threshold, or if the number of error determinations using control data included in the received data exceeds a threshold, the receiving mobile station 200 determines that it is located in a weak signal environment in which the strength of an electronic signal is weak. Herein, since a data rate of data received by the receiving mobile station 200 is almost fixed as 64 kbps, it is possible to monitor the data, which is transmitted during a set time interval, every set time interval. Thus, the receiving mobile station 200 can easily determine whether a wireless environment is deteriorated based on the monitored channel state. If the receiving mobile station 200 recognizes that it is in a weak signal environment, in step S300, the receiving mobile station 200 transmits a user input message to the transmitting mobile station 100 to request that audio data is preferentially transmitted. Herein, the structure of the user input message refers to an H.245 specification.

When the receiving mobile station 200 informs the transmitting mobile station 100 of a state of a weak electric field, in step 320, the transmitting mobile station 100 stops the transmission of the video data by changing a current mode in which A/V data is transmitted together to an audio only mode and transmits only the audio data. As soon as changing to the audio only mode, the transmitting mobile station 100 accumulates in a local buffer the audio data to be transmitted for as many repeated transmissions required and then transmits the audio data.

Figure 5:
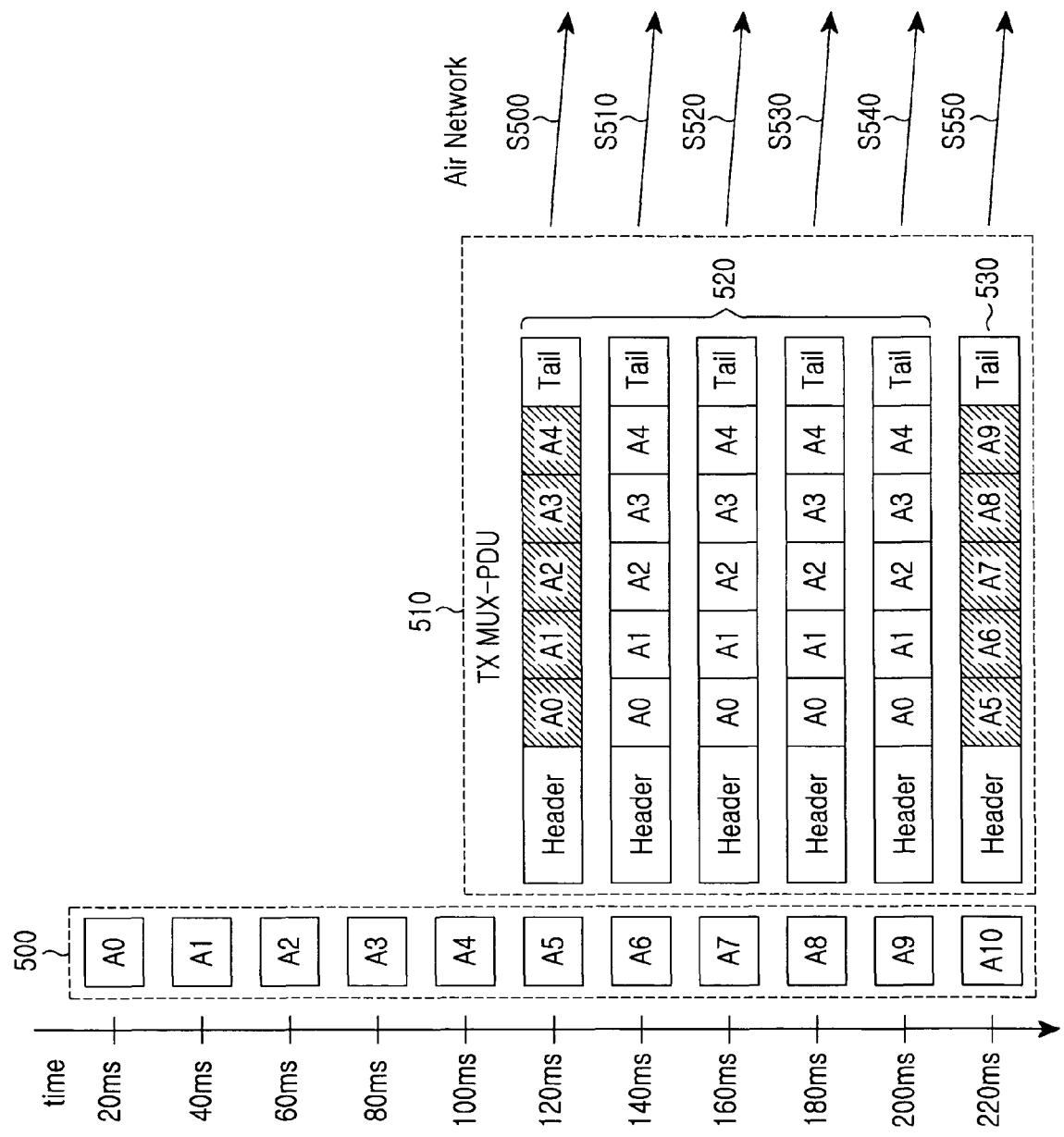
FIG. 5 is a diagram for explaining a method of performing a video call in an audio only mode in the transmitting mobile station according to a preferred embodiment of the present invention.

The above-described process will now be described in more detail with reference to FIG. 5. FIG. 5 is a diagram for explaining a method of performing a video call in the audio only mode in the transmitting mobile station 100 according to a preferred embodiment of the present invention. Referring to FIG. 5 and FIG. 3B, when changing to the audio only mode, the transmitting mobile station 100 encodes audio data 500 to be transmitted using the audio codec 130. The encoded audio data 500 is output to the MUX layer 110 through the AL 120. The MUX layer 110 generates a predetermined number of MUX-PDUs by combining each of audio data so that the amount of data to be transmitted does not exceed 160 bytes. For example, when the transmitting-mobile station 100 intends to repeatedly transmit data 5 times a weak signal environment, transmitting mobile station 100 can combine and transmit 5 frames of audio data. Accordingly, the MUX layer 110 can generate a single MUX-PDU with audio data A0, A1, A2, A3, and A4 of a 20 ms unit as a reference numeral 510.

In particular, the audio only mode is performed only in a weak signal environment, and in a weak signal environment, if only a single MUX-PDU is transmitted, the receiving mobile station 200 may not receive the MUX-PDU. Thus, the transmitting mobile station 100 repeatedly transmits the same MUX-PDU during a set time interval. When 5 MUX-PDUs including the same audio data A0, A1, A2, A3, and A4 are generated as a reference numeral 520, the transmitting mobile station 100 continuously transmits each MUX-PDU 5 times within a 20 ms interval. When a single MUX-PDU is generated by combining 5 frames of the audio data, the audio data is continuously accumulated in the local buffer. Thus, after the MUX layer 110 generates the MUX-PDU by combining the 5 frames of the audio data and repeatedly transmits the MUX-PDU 5 times, the MUX layer 110 repeatedly generates a MUX-PDU 530 with audio data A5, A6, A7, A8, and A9 corresponding to next 5 frames. The TX (Transmit) MUX-PDU 540 composed of MUX-PDUs generated through the above-described process is transmitted through relevant traffic channel S500 to S550 during a set time interval.

Figure 6:
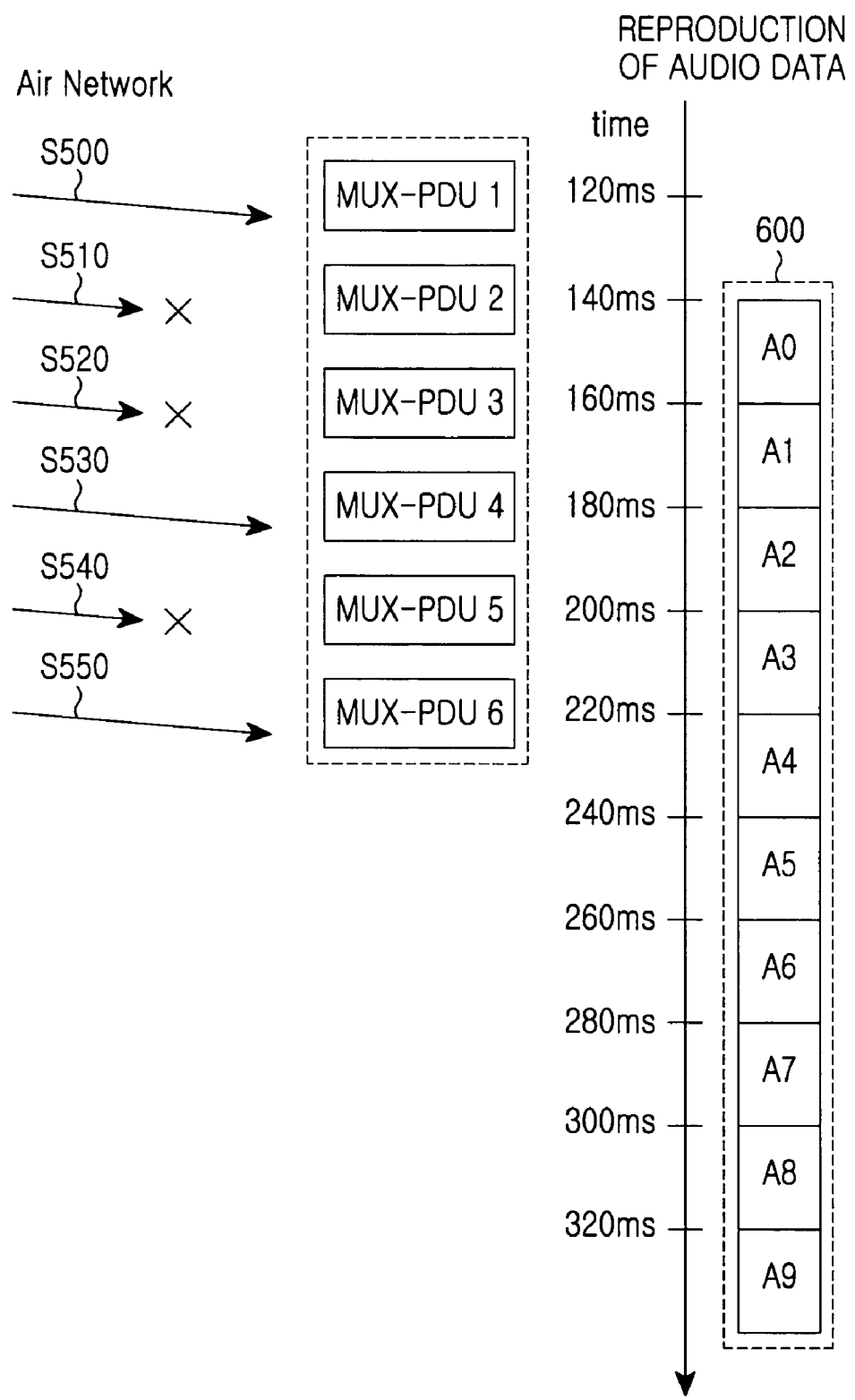
FIG. 6 is a diagram for explaining a method of performing a video call in the audio only mode in the receiving mobile station according to a preferred embodiment of the present invention.

FIG. 6 is a diagram for explaining a method of performing a video call in the audio only mode in the receiving mobile station 200 according to a preferred embodiment of the present invention. Referring to FIG. 6, when the receiving mobile station 200 receives data from the transmitting mobile station 100, the receiving mobile station 200 checks the integrity of the data, i.e., determines if an error exists in the data using CRC obtained by the MUX layer 210 and the AL 220 of FIG. 3B. If abnormal data is transmitted, the receiving mobile station 200 discards the abnormal data and decodes only normal data using the audio codec 230. Herein, since audio data is repeatedly transmitted, the MUX layer 210 stores normally transmitted data, and only if subsequent data is not identical to previous data, the MUX layer 210 transmits the subsequent data to the audio codec 230 through the AL 220.

In detail, the receiving mobile station 200 receives MUX-PDUs through the traffic channels S500 to S550 during a set time interval, e.g., every 20 ms, as illustrated in FIG. 6. The MUX-PDUs transmitted through the traffic channels S500 to S550 are a MUX-PDU1 to a MUX-PDU6 in FIG. 6. Herein, even if the transmitting mobile station 100 sequentially transmits data through the traffic channels S500 to S550, since a wireless environment is deteriorated, the receiving mobile station 200 may receive some of the data. That is, in FIG. 6, data through the traffic channels S510, S520, and S540 is not normally transmitted, or an error is generated in each data through the traffic channels S510, S520, and S540. On the contrary, data is normally transmitted through the traffic channels S500, S530, and S550.

When it is determined that the MUX-PDU1 transmitted through the traffic channel S500 is normal data using CRC, decoding of the MUX-PDU1 is performed, and the audio data A0, A1, A2, A3, and A4 of a 20 ms unit are output. By doing this, the audio of a total of 100 ms is reproduced. The receiving mobile station 200 stores the reproduced audio data, and when it is determined that the MUX-PDU4 transmitted through the traffic channel S530 is normal data using CRC, the receiving mobile station 200 compares MUX-PDU1 with MUX-PDU4. That is, the receiving mobile station 200 compares whether the audio data of the currently received MUX-PDU4 is identical to audio data of the previously received MUX-PDU1. If they include the same audio data, the receiving mobile station 200 ignores the currently received MUX-PDU4. When MUX-PDU6 is received through the traffic channel S550, the receiving mobile station 200 compares MUX-PDU1 with MUX-PDU6. If the audio data of MUX-PDU6 is different from the audio data of MUX-PDU1, i.e., if they are not duplicated, the receiving mobile station 200 recognizes that the new audio data is received and reproduces the new audio data A5, A6, A7, A8, and A9. By doing this, the receiving mobile station 200 can output seamless audio data without audio interruption. As a result, by repeatedly receiving a MUX-PDU from the transmitting mobile station 100 for a predetermined number of times, the receiving mobile station 200 can prevent an audio data loss the most and continuously reproduce by arranging the audio data.

While the audio only mode is being performed, if the strength of an electronic signal returns to the normal state due to movement of the user or other reasons, the wireless environment can become excellent. When the amount of data transmitted from the transmitting mobile station 100 returns to the normal state, or when the number of errors is reduced, the receiving mobile station 200 can recognize that it is no longer in a weak signal environment. In step S310 of FIG. 4, the receiving mobile station 200 transmits a user input message to the transmitting mobile station 100 to request that the audio only mode is released since the network state is stable. Of course, S310 can be done automatically by the receiving mobile station 200. When the transmitting mobile station 100 receives the audio only mode release request message, the transmitting mobile station 100 returns to a previous state and performs the mode in which A/V data is transmitted together. In step 330 of FIG. 4, the transmitting mobile station 100 transmits A/V data together.

As described above, in the inventive method, by preferentially and repeatedly transmitting audio data when in a weak signal environment occurs, audio interruption can be reduced, thereby securing a minimum audio QoS.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of providing a video call service in a mobile station in a weak signal environment, the method comprising the steps of:
   determining, by a receiving mobile station (MS), whether the receiving mobile station is in a weak signal environment based on the quality of audio and video (A/V) data included in a multiplexer protocol data unit (MUX-PDU) and transmitted from a transmitting mobile station during a video call;
   if it is determined that the MS is in a weak signal environment, requesting, by the receiving mobile station, that only the audio data is transmitted;
   generating, by the transmitting mobile station, the MUX-PDU by allocating only the audio data to a video data field of the MUX-PDU in response to the request, and repeatedly transmitting the MUX-PDU for a preset time before generating and repeatedly transmitting a next MUX-PDU from the sequence; and
   when the MUX-PDU is received, processing the audio data by the receiving mobile station so that the audio data is continuously reproduced.

2. The method of claim 1, wherein the step of determining if an MS is in a weak signal environment comprises the steps of:
   determining if an error exists in data repeatedly transmitted from the transmitting mobile station; and
   recognizing that the receiving mobile station is in a state of a weak electric field if the number of errors exceeds a threshold.

3. The method of claim 1, wherein the step of determining if an MS is in a weak signal environment comprises the steps of:
   determining an amount of data repeatedly transmitted from the transmitting mobile station; and
   recognizing that the receiving mobile station is in a state of a weak electric field if the amount of received data is below a threshold.

4. The method of claim 1, further comprising the steps of:
   determining an amount of received audio data received from the transmitting mobile station;
   transmitting to the transmitting MS a message notifying that the receiving MS no longer in a weak signal environment if the amount of received audio data exceeds a threshold; and
   returning to a mode in which the A/V data is transmitted together.

5. The method of claim 1, wherein in the step of requesting that audio data is preferentially transmitted, a user input message for informing of a state of a weak electric field is transmitted.

6. The method of claim 5, wherein the user input message is based on an H.245 specification.

7. The method of claim 5, further comprising the steps of:
   changing to an audio only mode when the user input message is received;
   encoding audio data;
   assigning a sequential number to the encoded audio data, generating Cyclic Redundancy Checking (CRC) for error checking, and adding the CRC to the encoded data; and
   accumulating the audio data, generating the MUX-PDU by multiplexing the accumulated audio data, and transmitting the MUX-PDU for a predetermined number of times during a set time interval.

8. The method of claim 7, wherein the accumulated audio data does not exceed 160 bytes according to an H.324M specification.

9. The method of claim 1, wherein the step of processing the audio data so that the audio data is continuously reproduced comprises the steps of:
   checking for errors in the audio data received from the transmitting mobile station;
   reproducing the audio data when it is without errors;
   comparing previously reproduced audio data with subsequent audio data received during the set time interval; and
   reproducing the subsequent audio data so as to follow the previously reproduced audio data if the subsequent audio data is different from the previously reproduced audio data.

10. The method of claim 9, wherein the step of checking for errors is achieved by checking CRC in the received audio data.

11. The method of claim 9, further comprising the step of:
    discarding the subsequent audio data if the subsequent audio data is essentially equal to the previously reproduced audio data.

* * * * *